(12) United States Patent
Fujiu

(10) Patent No.: US 9,948,447 B2
(45) Date of Patent: Apr. 17, 2018

(54) COMMUNICATION APPARATUS

(71) Applicant: APRESIA Systems, Ltd., Minato-ku, Tokyo (JP)

(72) Inventor: Daisuke Fujiu, Tsuchiura (JP)

(73) Assignee: APRESIA Systems, Ltd., Tokyo (JP)

( * ) Notice: Subject to any disclaimer, the term of this patent is extended or adjusted under 35 U.S.C. 154(b) by 30 days.

(21) Appl. No.: 15/450,429

(22) Filed: Mar. 6, 2017

(65) Prior Publication Data
US 2017/0257209 A1 Sep. 7, 2017

(30) Foreign Application Priority Data

Mar. 7, 2016 (JP) .................. 2016-043455

(51) Int. Cl.
*H04L 7/00* (2006.01)
*H04L 7/04* (2006.01)

(52) U.S. Cl.
CPC .............. *H04L 7/0008* (2013.01); *H04L 7/04* (2013.01)

(58) Field of Classification Search
CPC ...... H04L 7/0083; H04L 7/033; H04J 3/0688; H04J 3/0608; H03L 7/143
USPC ................................ 375/354–376
See application file for complete search history.

(56) References Cited

U.S. PATENT DOCUMENTS

| | | | | |
|---|---|---|---|---|
| 4,411,007 A * | 10/1983 | Rodman | ............... | H04J 3/0682 375/356 |
| 4,414,676 A * | 11/1983 | Kraul | .................. | H04W 88/026 340/146.2 |
| 4,598,413 A * | 7/1986 | Szechenyi | ............. | H04J 3/0608 370/514 |
| 5,410,263 A * | 4/1995 | Waizman | ............... | H03K 5/133 327/141 |
| 5,731,829 A * | 3/1998 | Saito | .......................... | B41J 3/36 347/104 |
| 5,793,823 A * | 8/1998 | Nishio | ...................... | G06F 5/08 327/152 |
| 6,078,595 A * | 6/2000 | Jones | .................... | H04J 3/0688 370/219 |
| 6,121,816 A * | 9/2000 | Tonks | ...................... | G06F 1/08 327/12 |

(Continued)

FOREIGN PATENT DOCUMENTS

JP 2015-119257 A 6/2015

*Primary Examiner* — James M Perez
(74) *Attorney, Agent, or Firm* — Crowell & Moring LLP

(57) ABSTRACT

Provided is a communication apparatus usable for any case where a time synchronization function is necessary or unnecessary by attaching or detaching a synchronization model for realizing the time synchronization function. A clock generation unit, a logic circuit unit including a synchronization module monitoring unit, a clock selection unit, and a main circuit unit configured by a switch LSI are integrally formed on the same substrate, and the synchronization module is detachably mounted on the substrate via connectors. The connectors each have a mounting determination pin that indicates a different signal level depending on whether the synchronization module is mounted. The synchronization module monitoring unit monitors connection signals indicating signal levels of the mounting determination pin, and causes the clock selection unit to select a synchronization clock when the synchronization module is mounted, and an internal clock when the synchronization module is not mounted.

16 Claims, 3 Drawing Sheets

(56) References Cited

U.S. PATENT DOCUMENTS

| | | | | |
|---|---|---|---|---|
| 6,285,723 B1* | 9/2001 | Yamada | G06F 1/04 | 327/229 |
| 6,462,996 B2* | 10/2002 | Ooishi | G11C 29/30 | 365/201 |
| 6,853,226 B2* | 2/2005 | Kwak | H03L 7/0805 | 327/159 |
| 6,900,683 B2* | 5/2005 | Lindberg | H03K 5/135 | 327/162 |
| 7,443,911 B2* | 10/2008 | Tadayyon | H04L 12/2801 | 348/E5.003 |
| 7,561,651 B1* | 7/2009 | Karabatsos | G06F 1/12 | 375/371 |
| 7,649,910 B1* | 1/2010 | Wechsler | H04J 3/0688 | 370/503 |
| 7,822,111 B2* | 10/2010 | Sohn | H04L 25/03038 | 375/231 |
| 9,521,636 B2* | 12/2016 | Shor | H04W 56/001 | |
| 9,805,785 B2* | 10/2017 | Hayashi | G11C 11/4076 | |
| 2001/0001616 A1* | 5/2001 | Rakib | H03M 13/256 | 375/259 |
| 2003/0175112 A1* | 9/2003 | Namiki | F04D 19/04 | 415/90 |
| 2004/0012429 A1* | 1/2004 | Lindberg | H03K 5/135 | 327/277 |
| 2008/0010541 A1* | 1/2008 | Kudo | G06F 11/3656 | 714/38.13 |
| 2009/0041104 A1* | 2/2009 | Bogdan | H03K 5/15013 | 375/226 |
| 2010/0135448 A1* | 6/2010 | Park | H04L 7/0083 | 375/362 |
| 2010/0182046 A1* | 7/2010 | Otsuga | G06F 1/12 | 326/93 |
| 2011/0188619 A1* | 8/2011 | Sugioka | G06F 1/10 | 375/354 |
| 2012/0059964 A1* | 3/2012 | Foster | G06F 1/12 | 710/300 |
| 2012/0087402 A1* | 4/2012 | Patoine | H04J 3/0697 | 375/226 |
| 2012/0200364 A1* | 8/2012 | Iizuka | H03B 5/1228 | 331/117 FE |
| 2015/0156009 A1* | 6/2015 | Bogdan | H04L 27/2601 | 375/376 |
| 2015/0280956 A1* | 10/2015 | Bogdan | H04L 27/2656 | 375/375 |
| 2017/0301587 A1* | 10/2017 | Yoshida | H01L 21/82 | |
| 2017/0338939 A1* | 11/2017 | Bogdan | H04L 27/2675 | |

* cited by examiner

US 9,948,447 B2

COMMUNICATION APPARATUS

CROSS-REFERENCE TO RELATED APPLICATION

The present application claims priority from Japanese Patent Application No. 2016-043455 filed on Mar. 7, 2016, the content of which is hereby incorporated by reference into this application.

TECHNICAL FIELD OF THE INVENTION

The present disclosure relates to a communication apparatus having a time synchronization function.

BACKGROUND OF THE INVENTION

Patent Document 1 (Japanese Patent Application Laid-Open No. 2015-119257) discloses a communication apparatus comprising a time synchronization function of matching timing or phase of clock, and a time indicated by the timing of the clock among communication apparatuses configuring a network with high accuracy.

SUMMARY OF THE INVENTION

Such a time synchronization function is necessary when a high-accuracy time synchronization function is requested, but is not necessarily needed when only a certain degree of accuracy is desired.

However, there are problems that it is time-consuming to produce different machine types of communication apparatus depending on whether the time synchronization function is necessary or unnecessary, and that the production brings high costs.

One aspect of the present disclosure has been made in terms of the problems, and has an object of providing a communication apparatus usable for any case where the time synchronization function is necessary or unnecessary only by attaching or detaching a synchronization module for realizing the time synchronization function.

According to one aspect of the present disclosure, a communication apparatus comprises a synchronization module, a clock generation unit, a monitoring unit, a selection unit, and a main circuit unit. The synchronization module generates a synchronization clock synchronized with an externally-inputted reference signal. The clock generation unit generates an internal clock different from the synchronization clock. The monitoring unit monitors a state of the synchronization module. The selection unit selects either the synchronization clock or the internal clock depending on a monitoring result of the monitoring unit. The main circuit unit is supplied with the clock selected by the selection unit and performs control related to communication. Incidentally, the clock generation unit, the main circuit unit, the monitoring unit, and the selection unit are formed on the same substrate, and the synchronization module is detachably mounted on the substrate via connectors. Further, the connectors each have a mounting determination pin that indicates a different signal level depending on whether the synchronization module is mounted. Additionally, the monitoring unit monitors the signal level of the mounting determination pin, and causes the selection unit to select the synchronization clock when the synchronization module is mounted, and the internal clock when the synchronization module is not mounted.

By this configuration, when the synchronization module is not mounted, the main circuit unit is supplied with the internal clock, and when the synchronization module is mounted, the main circuit unit is supplied with the synchronization clock. Therefore, by mounting the synchronization module when a function of synchronizing an operation clock of the main circuit unit with a standard signal is required, and by mounting no synchronization module when the function is not required, both cases can be adapted to without a special operation. Additionally, different model types of communication apparatus do not need to be produced depending on whether the function is necessary or unnecessary, thereby reducing manufacture costs.

BRIEF DESCRIPTIONS OF THE DRAWINGS

DESCRIPTIONS OF THE PREFERRED EMBODIMENTS

An embodiment according to the present invention will be described below with reference to the drawings.

1. Entire Configuration

A communication apparatus 1 according to the present embodiment is a box-type switch apparatus functioning as a so-called layer-2 switch for performing a layer-2 relay processing based on OSI (Open Systems Interconnection). The box-type switch apparatus will be described herein by way of example, but the switch apparatus is not limited thereto and may be a chassis-type switch apparatus. Further, the switch apparatus may function as a layer-3 switch, not limited to the apparatus functioning as the layer-2 switch.

Figure 1:
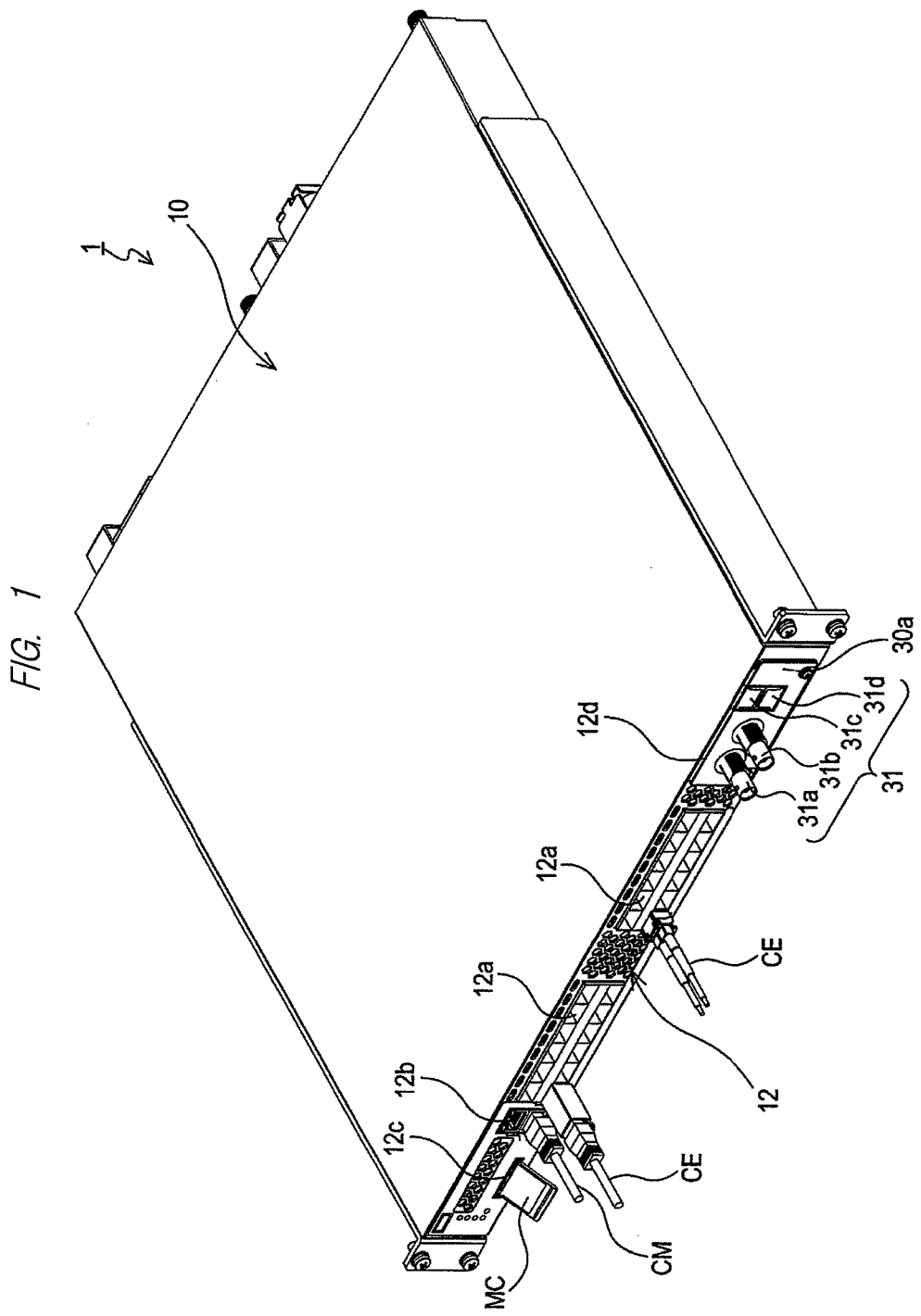
FIG. 1 is a perspective view of a communication apparatus.
Figure 2:
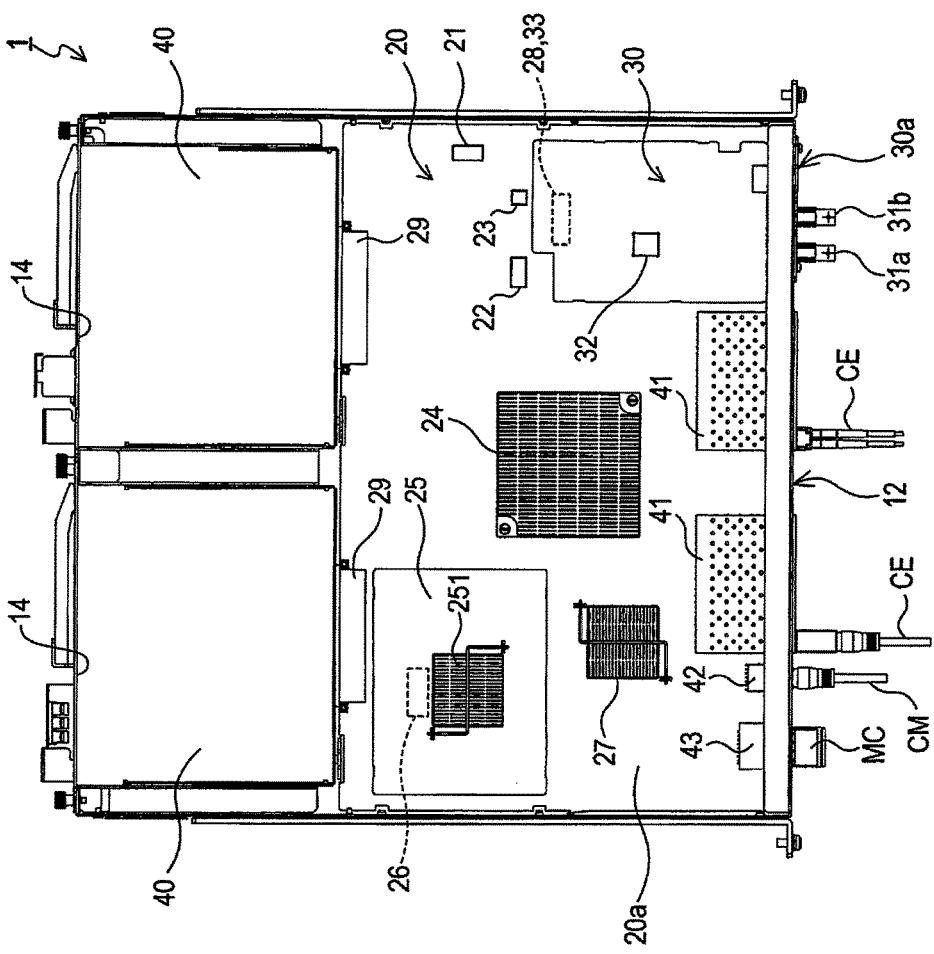
FIG. 2 is a plan view illustrating an arrangement of parts inside the communication apparatus.

As illustrated in FIG. 1 and FIG. 2, the communication apparatus 1 comprises a rectangular-parallelepiped casing 10. The casing 10 houses therein a main board 20, a synchronization module 30, and two power supply modules 40, 40.

A front panel 12 is provided on a front of the casing 10, and the front panel 12 is provided with: many external ports 12a capable of mounting thereon connectors for cables CE each configuring a local area network (or LAN); a management port 12b capable of mounting thereon a connector for a cable CM configuring a management network; a card slot 12c capable of mounting a memory card MC thereon; and a synchronization slot 12d capable of mounting the synchronization module 30 thereon. Incidentally, the external ports 12a and the management port 12b provide interfaces for making communication according to Ethernet as one of LAN standards.

Two power supply slots 14, 14 for mounting the power supply modules 40, 40 thereon are provided on a back of the casing 10. The power supply module 40 is a well-known module in which a commercial power supply inputted is converted to a DC voltage with a predetermined voltage (such as 5 V) and supplied to each unit in the communication apparatus 1, and two identical modules are provided for bringing redundancy.

2. Synchronization Module

The synchronization module 30 is a module for realizing a time synchronization system using a network defined by IEEE (Institute of Electrical and Electronic Engineers) 1588, and is mounted on the synchronization slot 12*d* on the front panel 12 for use. An application for dividing and transmitting data such as 4 k streaming transmits data via a high-speed transmission path such as Gigabit Ethernet, and an application on a reception side restores the data. However, even by use of high-speed Gigabit Ethernet, the application sides may be unable to restore the data for a difference in transmission path, a delay per transmission path, and a delay due to an apparatus on the transmission path. The synchronization module 30 is used for acquiring accurate time information necessary on this restoration. The function realized by the synchronization module 30 is called "time synchronization function" below.

Figure 3:
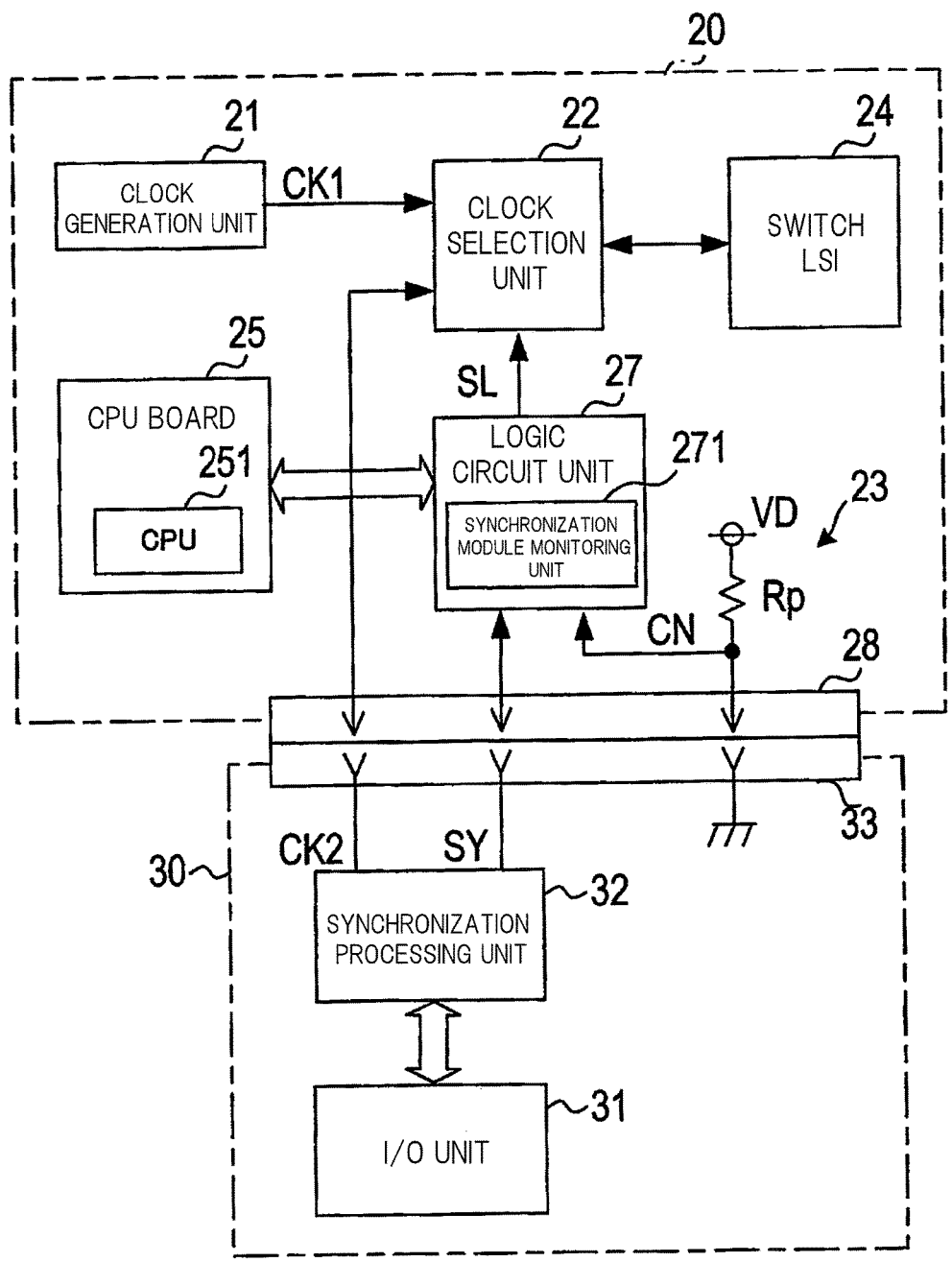
FIG. 3 is a block diagram illustrating a configuration for supplying a clock in the communication apparatus.

The synchronization module 30 comprises an I/O unit 31, a synchronization processing unit 32, and a connector 33 as illustrated in FIG. 2 and FIG. 3.

The I/O unit 31 has two I/O ports 31*a*, 31*b* each made of a coaxial connector, such as a BNC connector, and two I/O ports 31*c*, 31*d* each made of a RJ45 connector on a front part 30*a* exposed outside the front panel 12 when mounted on the synchronization slot 12*d*. Various signals required for realizing timing synchronization and time synchronization are inputted and outputted into and from the respective I/O ports 31*a* to 31*d* in a network configured by a plurality of communication apparatuses each having the similar function to the communication apparatus 1. Incidentally, the timing synchronization is directed for matching a frequency or phase of a clock signal serving as an operable reference for each communication apparatus 1, and the time synchronization is directed for matching a time indicated by timing of the clock signal. Those signals can employ a timing signal or time information extracted from a broadcasting wave including information on standard time (eg. UTC (Coordinated Universal Time) or USNO (US Naval Observatory Master Clock Time)). More specifically, thought of as such broadcasting waves are a transmission wave from a global navigation satellite in a satellite positioning system (such as GPS), a standard wave indicating Japan standard time, a transmission wave from base stations for cellar phones, and the like. Incidentally, "GPS" stands for a Global Positioning System.

The synchronization processing unit 32 is configured by a digital PLL circuit or the like, and is configured to generate, based on the signal or information input from the I/O ports 31*a* to 31*d*, a synchronization clock CK2 serving as a clock that performs the timing synchronization, and a synchronization signal SY showing a condition about whether the timing synchronization is established, and to output them to the main board 20 via the connector 33.

The connector 33 is attached and detached to and from a below-described synchronization module connector 28 provided on the main board 20, and has at least pins for outputting the synchronization clock CK2 and the synchronization signal SY, and a mounting determination pin for determining a mounting state between the connectors 33 and 28. Incidentally, the mounting determination pin is connected to ground (earthed).

3. Main Board

The main board 20 comprises a rectangular substrate 20*a* forming print wirings on both surfaces as illustrated in FIG. 1 to FIG. 3. Arranged on a part surface as one-side surface of the substrate 20*a* are two interface modules (referenced as "IF module" below) 41, 41; a management IF module 42; a memory IF module 43; a clock generation unit 21; a clock selection unit 22; a connection state monitoring unit 23; a switch LSI 24; a CPU board 25; a maintenance management LSI 26; a logic circuit unit 27; the synchronization module connector 28; and power supply module connectors 29, 29 etc.

The IF modules 41, 41 are each a transceiver for providing 1-Gbps or 10-Gbps Ethernet interface conforming to the IEEE802.3 standard for 12 ports. The interface is provided via the external ports 12*a* formed on the front panel 12.

The management IF module 42 is a transceiver for providing any of 10-Mbps, 100-Mbps, or 1-Gbps Ethernet interface conforming to the IEEE802.3 standard for two ports. The interface is provided via the management port 12*b* formed on the front panel 12. The number of modules 41 to 43 to be mounted is not limited to the number indicated in the present embodiment, and any number of modules may be employed.

The memory IF module 43 is an apparatus directed for controlling read/write from/into the memory card MC mounted on the card slot 12*c*.

The power supply module connectors 29, 29 are provided on the substrate 20*a*, and are connectors directed for electrically connecting the power supply modules 40, 40 mounted on the power supply slots 14, and the substrate 20*a*.

The synchronization module connector 28 is provided on the substrate 20*a*, and is a connector directed for electrically connecting the synchronization module 30 mounted on the synchronization slot 12*d*, and the substrate 20*a*. Specifically, the synchronization module connector 28 is attached and detached to and from the connector 33 that the synchronization module 30 has, and has at least pins for inputting the synchronization clock CK2 and the synchronization signal SY corresponding to the connector 33, and a mounting determination pin used for determining a mounting state between the connectors 28 and 33.

The clock generation unit 21 is configured by a crystal oscillator or the like, and generates an internal clock CK1 serving as a clock signal with a preset frequency independently of the synchronization clock CK2 generated by the synchronization module 30.

The clock selection unit 22 selects either the internal clock CK1 generated by the clock generation unit 21 or the synchronization clock CK2 supplied via the connector 28 according to a selection signal SL outputted by the logic circuit unit 27, and supplies it to a main circuit unit for performing control about communication such as a switch LSI 24. Incidentally, the main circuit unit may include the IF module 41 or the like.

The connection state monitoring unit 23 is configured by a resistor Rp for pulling up the mounting determination pin serving as one of the pins configuring the connector 28 until a power supply voltage VD. Then, the unit is connected so that the signal level at an end of the mounting determination pin of the resistor Rp is supplied as a connection signal CN to the logic circuit unit 27. That is, the connection signal CN is at high level when the connectors 28 and 33 are not connected, namely, the synchronization module 30 is in no mounted state; and is at low level when they are connected, namely, the synchronization module 30 is in a mounted state.

The switch LSI 24 is a semiconductor integrated circuit for realizing a switch function of relaying an Ethernet frame transmitted/received via the IF modules 41, 41.

The CPU board 25 comprises a CPU 251 for performing various kinds of control on setting, monitoring, or the like of each device configuring the communication apparatus 1, and is connected to a connector (not illustrated) provided on the substrate 20a. The CPU 251 makes communication with each device configuring the communication apparatus 1 via a control communication network configured by an I2C (Inter-Integrated Circuit) or the like, thereby realizing the above control.

The maintenance management LSI 26 is arranged at a position covered with the CPU board 25 on the substrate 20a. The maintenance management LSI 26 is a semiconductor integrated circuit having a function of: controlling an activation sequence at power-on or reset; and monitoring each unit in the communication apparatus 1 and performing control at abnormality detection in response to an instruction from the CPU 251.

The logic circuit unit 27 is a semiconductor integrated circuit for realizing various functions required for maintenance management and the like of the communication apparatus 1 by a logic circuit, and is configured using FPGA. Incidentally, "FPGA" stands for Field Programmable Gate Array. The logic circuit unit 27 comprises at least a synchronization module monitoring unit 271 for generating the selection signal SL according to the synchronization signal SY inputted via the connector 28 and the connection signal CN from the connection state monitoring unit 23. The synchronization module monitoring unit 271 generates the selection signal SL for: causing the clock selection unit 22 to select the synchronization clock CK2 when the connection signal CN indicates a synchronization-module connected state and when the synchronization signal SY is in the synchronized state; and causing the clock selection unit 22 to select the internal clock CK1 at other cases. Further, the synchronization module monitoring unit 271 also has a function of holding a signal level of the connection signal CN or the synchronization signal SY to be readable from the CPU 251.

Incidentally, the CPU 251 performs control etc. on a state of the synchronization module 30 to be displayed, for example, by use of a LED (not illustrated) etc. provided on the front panel 12 on the basis of the signal level of the connection signal CN or the synchronization signal SY read from the logic circuit unit 27.

4. Operations

In the thus-configured communication apparatus 1, the clock selection unit 22 selects the internal clock CK1 when the synchronization module 30 is in no mounted state. On the other hand, when the synchronization module 30 is in the mounted state, the clock selection unit 22 selects the internal clock CK1 if a synchronization between the synchronization clock CK2 and the reference signal is not established, and selects the synchronization clock CK2 when the synchronization is established.

5. Effects

The following effects are obtained according to the embodiment described above in detail.

In the communication apparatus 1, when the synchronization module 30 is not connected or when the synchronization module 30 is connected but the synchronization between the synchronization clock CK2 and the reference signal is not established, the switch LSI 24 operates according to the internal clock CK1; and when the synchronization between the synchronization clock CK2 and the reference signal is established, the switch LSI 24 operates according to the synchronization clock CK2. Thus, by mounting the synchronization module 30 when the time synchronization function is required, and by mounting no synchronization module 30 when the time synchronization function is not required, both cases can be adapted to without any special operation. Further, different model types of communication apparatus do not need to be produced depending on whether the time synchronization function is necessary or unnecessary, thereby reducing manufacture costs.

6. Other Embodiment

The embodiment for implementing the present invention has been described above, but the present invention is not limited to the above embodiment and may be variously modified.

(A) The clock selection unit 22 is provided separately from the logic circuit unit 27 in the embodiment, but the clock selection unit 22 may be housed in the logic circuit unit 27 like the synchronization module monitoring unit 271.

(B) The synchronization module monitoring unit 271 generates the selection signal SL on the basis of both the connection signal CN and the synchronization signal SY in the embodiment, but it may generate the selection signal SL on the basis of either one signal.

(C) A plurality of functions of one component according to the embodiment may be realized by a plurality of components, or one function of one component may be realized by a plurality of components. Further, a plurality of functions that a plurality of components have may be realized by one component, or one function realized by a plurality of components may be realized by one component. Also, part of the configuration of the embodiment may be omitted. Additionally, at least part of the configuration of the embodiment may be added to or replaced with the configuration of other embodiment. Incidentally, all of forms encompassed in technical spirits specified only by the description of what is claimed are embodiments of the present invention.

(D) The present invention can be realized in various forms such as a system including the communication apparatus as one component besides the above communication apparatus.

What is claimed is:
1. A communication apparatus comprising:
    a synchronization module that generates a synchronization clock synchronized with an externally-inputted reference signal;
    a clock generation unit that generates an internal clock different from the synchronization clock;
    a monitoring unit that monitors a state of the synchronization module;
    a selection unit that selects either the synchronization clock or the internal clock according to a monitoring result of the monitoring unit; and
    a main circuit unit that is supplied with the clock selected by the selection unit and performs control related to communication, wherein
        the clock generation unit, the main circuit unit, the monitoring unit, and the selection unit are formed on a same substrate,
        the synchronization module is detachably mounted on the substrate via connectors,
        the connectors each have a mounting determination pin that indicates a different signal level depending on whether the synchronization module is mounted, and
        the monitoring unit monitors the signal level of the mounting determination pin, and causes the selection unit to select the synchronization clock when the synchronization module is mounted, and the internal clock when the synchronization module is not mounted.

2. The communication apparatus according to claim 1, wherein the main circuit unit includes:
an interface module providing a plurality of interfaces into and from which an Ethernet frame is inputted and outputted; and
a switch unit having a switch function of relaying the Ethernet frame inputted and outputted via the interface module.

3. The communication apparatus according to claim 1, wherein the synchronization module is configured to output a synchronization signal indicating whether the synchronization clock is synchronized with the reference signal, and
the monitoring unit is configured to cause the selection unit to select the synchronization clock when the synchronization module is mounted and the synchronization signal is synchronized.

4. The communication apparatus according to claim 2, wherein the synchronization module is configured to output a synchronization signal indicating whether the synchronization clock is synchronized with the reference signal, and
the monitoring unit is configured to cause the selection unit to select the synchronization clock when the synchronization module is mounted and the synchronization signal is synchronized.

5. The communication apparatus according to claim 1, wherein a signal extracted from a broadcasting wave including information on a standard time is employed as the reference signal.

6. The communication apparatus according to claim 2, wherein a signal extracted from a broadcasting wave including information on a standard time is employed as the reference signal.

7. The communication apparatus according to claim 3, wherein a signal extracted from a broadcasting wave including information on a standard time is employed as the reference signal.

8. The communication apparatus according to claim 4, wherein a signal extracted from a broadcasting wave including information on a standard time is employed as the reference signal.

9. A communication apparatus comprising:
a given substrate;
a synchronization module that generates a synchronization clock synchronized with an externally-inputted reference signal;
a clock generation unit that generates an internal clock different from the synchronization clock;
connectors each having a mounting determination pin that indicates a different signal level depending on whether the synchronization module is mounted, the synchronization module being detachably mounted on the given substrate via the connectors;
a monitoring unit that monitors a state of the synchronization module, the monitoring unit monitoring the signal level of the mounting determination pin;
a selection unit that selects either the synchronization clock or the internal clock according to a monitoring result of the monitoring unit, the monitoring unit: i) causing the selection unit to select the synchronization clock when the synchronization module is mounted, and ii) causing the selection unit to select the internal clock when the synchronization module is not mounted; and
a main circuit unit that is supplied with the clock selected by the selection unit and performs control related to communication, wherein
the clock generation unit, the main circuit unit, the monitoring unit, and the selection unit are formed on the given substrate.

10. The communication apparatus according to claim 9, wherein the main circuit unit includes:
an interface module providing a plurality of interfaces into and from which an Ethernet frame is inputted and outputted; and
a switch unit having a switch function of relaying the Ethernet frame inputted and outputted via the interface module.

11. The communication apparatus according to claim 9, wherein
the synchronization module is configured to output a synchronization signal indicating whether the synchronization clock is synchronized with the reference signal, and
the monitoring unit is configured to cause the selection unit to select the synchronization clock when the synchronization module is mounted and the synchronization signal is synchronized.

12. The communication apparatus according to claim 10, wherein
the synchronization module is configured to output a synchronization signal indicating whether the synchronization clock is synchronized with the reference signal, and
the monitoring unit is configured to cause the selection unit to select the synchronization clock when the synchronization module is mounted and the synchronization signal is synchronized.

13. The communication apparatus according to claim 9, wherein a signal extracted from a broadcasting wave including information on a standard time is employed as the reference signal.

14. The communication apparatus according to claim 10, wherein a signal extracted from a broadcasting wave including information on a standard time is employed as the reference signal.

15. The communication apparatus according to claim 11, wherein a signal extracted from a broadcasting wave including information on a standard time is employed as the reference signal.

16. The communication apparatus according to claim 12, wherein a signal extracted from a broadcasting wave including information on a standard time is employed as the reference signal.

* * * * *